Jan. 8, 1935. F. R. STIRN Re. 19,421

ORNAMENTED FELT AND FELT MATERIAL

Original Filed June 7, 1933

FELT BEFORE EMBOSSING

FELT AFTER EMBOSSING

AFTER NAPPING, AND/OR POUNCING

AFTER STEAMING

AFTER STEAMING

INVENTOR
FERDINAND R. STIRN
BY Richards & Geier
ATTORNEYS

Reissued Jan. 8, 1935 Re. 19,421

UNITED STATES PATENT OFFICE 19,421

ORNAMENTED FELT AND FELT MATERIAL

Ferdinand R. Stirn, Pelham, N. Y., assignor to F. & A. Stirn Corporation, New York, N. Y., a corporation of New York Original No. 1,941,281, dated December 26, 1933, Serial No. 674,665, June 7, 1933. Application for reissue September 20, 1934, Serial No. 744,830

8 Claims. (Cl. 41—24)

Figure 1:
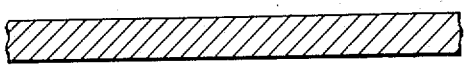

The present invention relates to a process of treating compact sheet fibrous materials, such as felt and felted materials, and to the novel felts and other materials produced thereby, and it particularly relates to a method of decorating such materials.

Although compact sheet fibrous materials, such as felts and felted materials, particularly for utilization in hats, have been produced for many years, they have usually been devoid of ornamentation, because of the difficulties of applying or forming any design or pattern on the surface thereof.

An object of the present invention is to provide an ornamented compact sheet fibrous material, such as felt and felted material which may be made most conveniently and inexpensively without substantial modification of the present processes of manufacturing and finishing such materials.

Other objects will appear during the course of the following specification.

According to the first procedure of the present invention compact sheet fibrous materials, such as felt or felted material, whether composed of fur, wool or other raw stock, in body, hood, strip, piece or other form, is pressed or embossed so as to form a design thereupon, portions of which are relatively depressed.

The embossed or ornamented fabric is then abraded, napped, or pounced, which process consists in partially or entirely removing the mounds of the elevated portions. This same process may also be employed to modify the appearance of the elevated portions.

Then the abraded, napped or pounced material is steamed or treated with moisture with the result that the depressed portion will expand, and depending upon the nature of the raw material used in the felt it may rise above the level of those portions which have been abraded. The resultant ornamentation will be permanent and will not be obliterated upon usage or wearing of the material even though long continued.

In the drawing is diagrammatically illustrated a method of making the ornamented compact sheet fibrous materials, such as the felt, belt material or felt fabric of the present invention.

In Figure 1 is shown the initial material before embossing.

Figure 2:
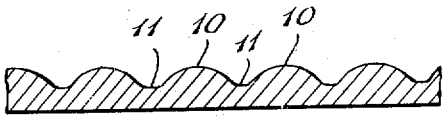

In Figure 2 the material is shown after embossing which will cause the formation of mounds 10 and the depressions 11, the mounds 10, being relatively slightly compressed while the depressions 11 are relatively highly compressed.

Figure 3:
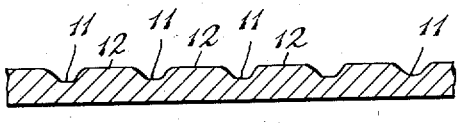

In Figure 3, the material is shown after napping, or pouncing, which preferably consists of an abrasion or sandpapering operation to remove the elevated portions of the mounds 10 to leave a sort of plateau formation, as indicated at 12.

When the napped, or pounced material, as shown in Figure 3 is then steamed or otherwise subjected to moisture the depressed portions 11 will in the form the invention shown, elevate themselves above the plateau portions 12. As a result, the embossed effect of Figures 4 and 5 will be obtained, the plateau portions being indicated at 12, while the expanded or elevated compressed portions are indicated at 11'.

It is possible by the selection of raw materials to obtain a product in substantially the condition shown in Figure 3 after treatment with moisture, where the compressed or depressed portions will still remain below the level of the plateaus 12.

The embossed effect, as shown in Figure 2, may be attained by suitably ornamenting and engraving the pressing forms or rollers. It is also possible to lay wires, ornamenting sheets or stencils, or other forms upon one of the pressing surfaces of the embossing apparatus to cause embossed designs upon the material.

While it is obvious that the embossing may be attained by a wide variety of different apparatus, it has been found most practical, when the material is in body or hood form, to cause the embossing to take place as a result of the hydraulic pressing operation which is utilized in giving the proper shape to the hat form. In this case, instead of hydraulically pressing the hood against a mold surface which is smooth, such mold surface is provided with an engraving or ornamented surface.

Instead of engraving the mold the face of the mold may be also provided with a series of ridges as by laying wires thereacross to produce any desired effect.

The method of embossing by hydraulic pressure is most conveniently carried out by pressing the body or hood against the embossed or engraved surface by a flexible rubber bag which is particularly adapted to apply pressure evenly to the entire body.

The ornamented material resulting according to the present invention may be utilized widely for many commercial purposes. It may be used for millinery, slippers, shoes, wearing apparel, hand bags, luggage, bath mats, pillow covers, upholstery for furniture and automobiles, table covers, wall coverings and so forth.

Figure 4:
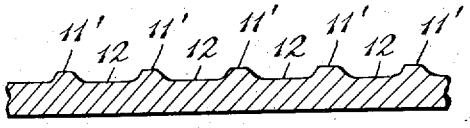
Figure 5:
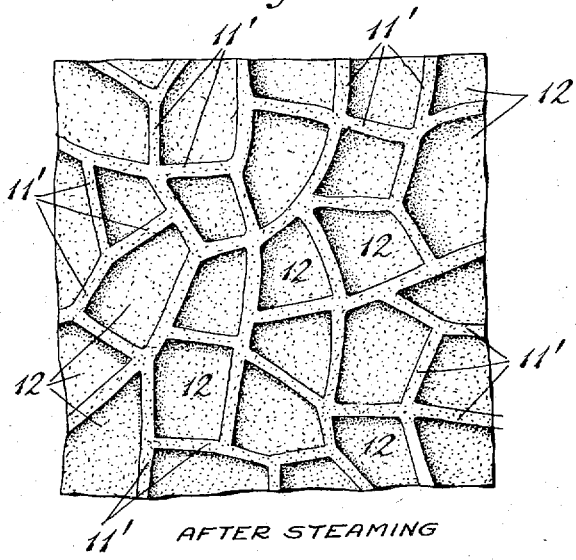

It is also possible to produce novel colored or surfacing effects according to the present invention by applying varnishes, pigments, and other surfacing effects to the material, even before or after embossing, as shown in Figures 1 and 2, respectively. The surfacing will be removed from the mounds in Figure 3 so that the plateaus as shown at 12 will not have such surfacing. As a result, after steaming, as shown in Figures 4 and 5, only the elevated portions 11′ will carry the ornamented surfacing.

If desired, the surfacing might also be applied by a roller in Figure 3, so that only the elevated portions of the plateaus 12 would receive the surfacing. In this case, in the final material in Figures 4 and 5, the surfacing would appear on the depressed portions 12 corresponding to the plateaus of Figure 3.

This ornamental surfacing, for example, might be conveniently accomplished by spraying colored varnishes, lacquers and metal or other finishes upon the materials in the form shown in either Figure 1 or Figure 2.

The ornamented and surfaced effects of the present invention may also be combined with stencilling effects. According to this modification, stencils, with ornamental designs are applied to the materials and such materials with stencils applied thereto, are then sandblasted or treated with an ornamenting material. The sandblasting would remove portions of the material while the application of the color or other ornamentation might lend desirable designs thereto.

It is obvious that many modifications might be made in the above invention without departing from the scope thereof.

What is claimed is:

1. A process of producing ornamented compact sheet fibrous materials which comprises forming an embossed pattern thereon, abrading to remove the elevated portions of said embossed material and then treating with moisture to cause elevating of the depressed portions above the remainder of the surface of the compact sheet fibrous material.

2. A process of producing ornamented felts and felted materials, which comprises providing a felt, forming an embossed pattern thereon, abrading the elevated portions of said embossed material and then steaming.

3. A process of producing ornamented felts or felted material in hood or body form, which comprises providing a felt in hood or body form, pressing such felt to form an embossed pattern thereon, abrading the elevated portions of said embossed material, and then steaming.

4. A process of producing ornamented, compact, matted fibrous sheet materials of insoluble protein character, which comprises treating said sheet materials to form a pattern thereon of relatively depressed, compressed portions and elevated relatively less compressed portions, abrading the elevated portions and then treating with moisture to cause elevation of said depressed, compressed portions.

5. The process of claim 4 in which the sheet fibrous material is prepared as a hat of hood or body form in which the pattern is formed by pressing the body or hood against an embossed surface by the application of fluid pressure by the use of a flexible rubber bag, an abrading wheel, and in which the elevation of the depressed portions is caused by the application of steam.

6. The process of finishing hats by treatment with moisture to produce a pattern thereon consisting of alternating closely spaced and confined areas respectively consisting of abraded and nonabraded surfaces, the preliminary steps of forming corresponding compressed relatively depressed, and uncompressed relatively elevated areas on said hat or hood in body form and then abrading said elevated portions.

7. A hat in hood or body form consisting of a pattern formed of relatively closely spaced relatively compressed depressed areas and abraded relatively uncompressed elevated portions, said compressed depressed portions being adapted to be elevated upon steaming.

8. A process of forming designs and patterns on ornamented compact sheet matted fibrous materials of protein character, said designs and patterns consisting of closely adjacent confined abraded and unabraded areas which comprises forming a corresponding pattern upon the sheet materials by compressing the unabraded areas so that they will be depressed below the level of the areas to be abraded, abrading the resultant elevated areas, and then re-elevating the depressed unabraded areas.

FERDINAND R. STIRN.